United States Patent
Hansson

Patent Number: 6,023,620
Date of Patent: Feb. 8, 2000

[54] METHOD FOR DOWNLOADING CONTROL SOFTWARE TO A CELLULAR TELEPHONE

[75] Inventor: Lars Hansson, Stockholm, Sweden

[73] Assignee: Telefonaktiebolaget LM Ecrisson, Stockholm, Sweden

[21] Appl. No.: 08/806,659

[22] Filed: Feb. 26, 1997

[51] Int. Cl.⁷ ................................................. H04Q 7/20
[52] U.S. Cl. ........................................ 455/419; 455/466
[58] Field of Search .............................. 455/418, 419.2, 455/466, 412, 422, 575, 517

[56] References Cited

U.S. PATENT DOCUMENTS

| | | | |
|---|---|---|---|
| 4,969,042 | 11/1990 | Houtman et al. | 358/160 |
| 5,043,721 | 8/1991 | May | 340/825 |
| 5,046,082 | 9/1991 | Zicker et al. | 379/59 |
| 5,109,403 | 4/1992 | Sutphin | 379/59 |
| 5,297,191 | 3/1994 | Gerszberg | 379/59 |
| 5,297,192 | 3/1994 | Gerszberg | 379/59 |
| 5,337,044 | 8/1994 | Folger et al. | 340/825 |
| 5,414,751 | 5/1995 | Yamada . | |
| 5,794,142 | 8/1998 | Vantilla et al. | 455/419 |

FOREIGN PATENT DOCUMENTS

| | | |
|---|---|---|
| 0 459 344 A1 | 5/1991 | European Pat. Off. . |
| 0 562 890 A1 | 3/1993 | European Pat. Off. . |
| 0 689 368 A1 | 6/1994 | European Pat. Off. . |
| 96/27270 | 9/1996 | WIPO . |

Primary Examiner—Wellington Chin
Assistant Examiner—Philip J. Sobutka
Attorney, Agent, or Firm—Jenkens & Gilchrist, P.C.

[57] ABSTRACT

The present invention comprises a method and apparatus for downloading software into a remotely located cellular telephone via wireless communication. The cellular telephone includes two memories for storing software with one memory storing the current software and the second memory available for downloading new software. The present invention further includes a processor in communication with the cellular telephone via cellular telephone network. The processor contains the new software and controls the downloading of the software from the processor into the cellular telephone memory. The cellular telephone includes a controller for loading the received software into the cellular telephone memory and for performing a checksum on the new software.

5 Claims, 2 Drawing Sheets

METHOD FOR DOWNLOADING CONTROL SOFTWARE TO A CELLULAR TELEPHONE

BACKGROUND OF THE INVENTION

1. Technical Field of the invention

The present invention pertains in general to a method and apparatus for remotely upgrading software in a cellular telephone, and more particularly, to remotely upgrade software in a cellular telephone via wireless communication using the Interim Standard-136 protocol.

2. Description of Related Art

Cellular telephones are typically programmed with two pieces of software, a first piece is hard coded in programmable read only memory (PROM) and a second, upgradable piece, is loaded into flash Programmable Read Only Memory (flash-PROM). The upgradable portion contains control software for the cellular telephone. Due to a variety of reasons including the addition of new features and "bug fixes," among others, the control software loaded in the flash-PROM may be periodically upgraded. If the reason for upgrading the control software occurs before the cellular telephone is shipped to a customer, the cellular telephone can be reprogrammed at the factory or at various points along the distribution chain. If, however, the reason for upgrading occurs after the customer has received the cellular telephone a cellular telephone customer will be required to bring the cellular telephone to a vendor for reprogramming. Alternatively, if the change to the software is minor, the cellular telephone customer may choose not to upgrade the cellular telephone. This may affect the quality of speech, reduce the number of functioning features, etc. resulting in an image of poor quality for the particular brand of cellular telephone. It would be advantageous therefore, to devise a method and apparatus to reprogram a cellular telephone remotely using a wireless communication link. Furthermore, it would be advantageous if such a method and apparatus retained the old software until the upgraded software has been tested and verified.

SUMMARY OF THE INVENTION

The present invention comprises a method and apparatus for downloading software into a remotely located cellular telephone via wireless communication. The cellular telephone includes two memories for storing software with a first memory storing the current software and the second memory available for downloading a new version of the software. The cellular telephone also includes a controller for loading the software received via wireless communications into the cellular telephone memory. The controller further calculates a checksum on the received data.

The present invention also includes an update server processor in communication with the cellular telephone via a cellular telephone network. The update server processor contains the new version of the software and controls the downloading of the software into the cellular telephone.

BRIEF DESCRIPTION OF THE DRAWINGS

For a more complete understanding of the present invention, reference is made to the following detailed description taken in conjunction with the accompanying drawings wherein.

DETAILED DESCRIPTION OF EMBODIMENTS

Although the description of the preferred embodiment details the implementation of the invention in the Interim Standard-136 protocol, the particular protocol is used by way of example and it is understood that the present invention can be practiced to other cellular telephone standards.

Figure 1:
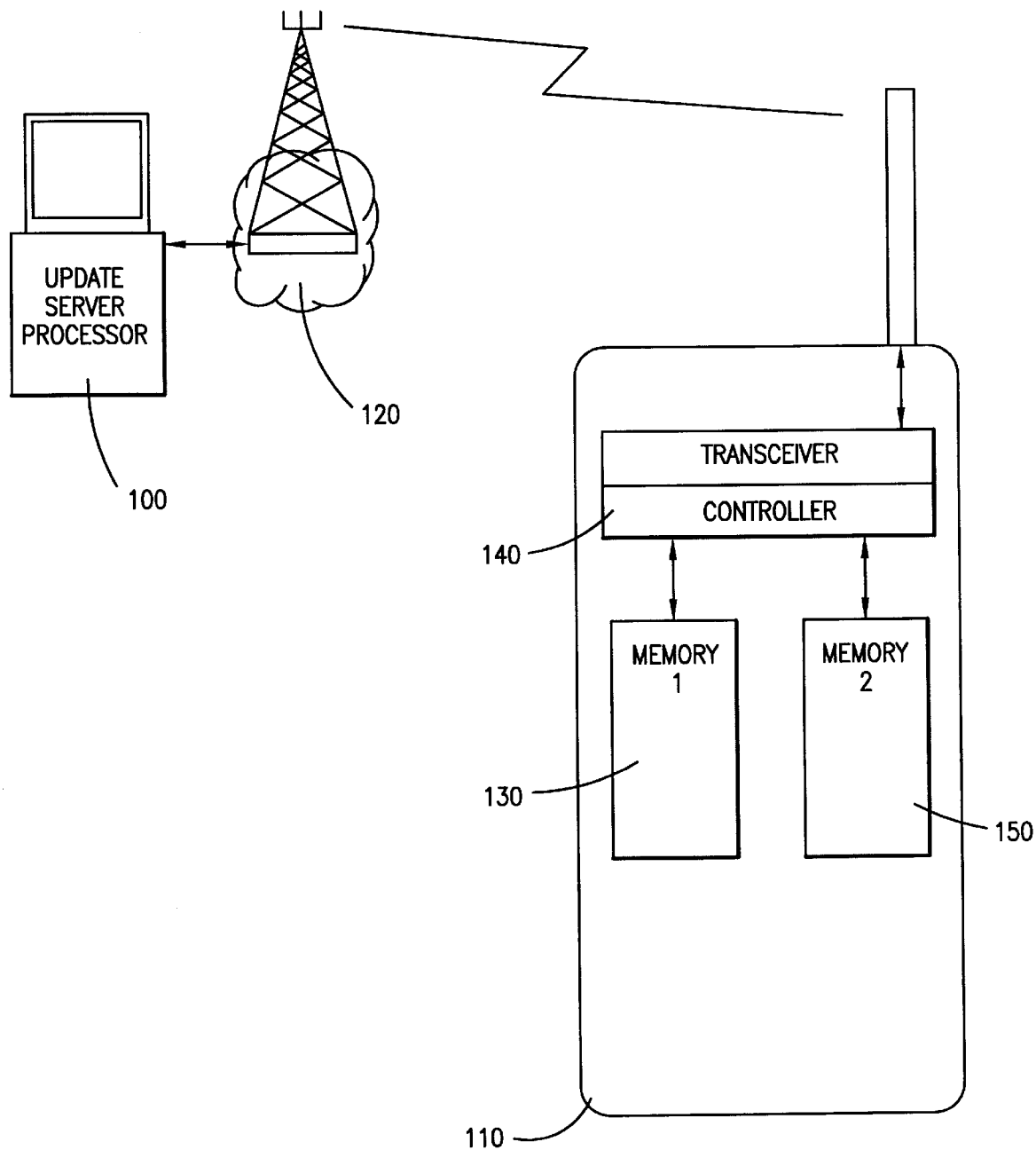
FIG. 1 illustrates a functional block diagram of an apparatus for a remotely downloading software into a cellular telephone.

Referring now to FIG. 1, there is illustrated an apparatus for remotely downloading software into a cellular telephone. An update server processor 100 communicates with a cellular telephone network 120 which in turn provides wireless communication to a cellular telephone 110. The update server processor 100 contains the new version of the software and controls the process for downloading the new software into the cellular telephone 110.

In addition to the functionality normally located within the cellular telephone 110, the cellular telephone 110 further contains a controller 140, a first memory 130, and a second memory 150. The controller 140 communicates with the update server processor 100 and loads software transmitted to the cellular telephone 110 from the update server processor 100 into either the first memory 130 or the second memory 150. The controller 140 designates one of the two memories 130 or 150 as active and the other as inactive with the active memory containing the software currently used by the cellular telephone 110. The controller 140 can also toggle between the two memories 130 and 150, thereby designating the formerly active memory as inactive, and conversely, designating the formerly inactive memory as active. Toggling between the memories 130 and 150 results in the cellular telephone 110 switching to use the software contained in the newly designated active memory. Before reaching the cellular telephone subscriber, the cellular telephone 110 is loaded with software in one of the two memories 130 or 150 at the factory and the same memory is designated as active. For purposes of this disclosure it is assumed that the software loaded at the factory is loaded into the first memory 130 and that the first memory 130 is designated as active and the second memory 150 is designated as inactive.

When a new version of the software is available, the update server processor 100 transmits a message via the cellular telephone network 120 to the cellular telephone 110 offering the option to download the new version of the software. The cellular telephone subscriber can choose to ignore the message, in which case the cellular telephone 100 continues to operate using the software currently located in the memory designated as active. Alternatively, the cellular telephone subscriber can choose to download the new version of the software immediately or at some time in the future, in which case the cellular telephone subscriber follows the instructions provided in the message offering to download the new software. Typically, the cellular telephone subscriber is instructed to depress a specific key or keys to initiate the downloading process.

If the cellular telephone subscriber accepts the offer to download the new software either now or in the future, the cellular telephone 110 transmits an acceptance code and the telephone number of the cellular telephone to the update service processor 100. The update server processor 100 receives the acceptance code and telephone number, and when it is ready to download the software, transmits a command instructing the cellular telephone 110 to prepare to receive the new software. The cellular telephone 110 responds to the command by transmitting an acknowledgment message to the update server processor 100 and waits for a data transfer to the cellular telephone. The update server processor 100 transmits the new version of the software to the cellular telephone 110 and the controller 140 loads the new software into the inactive memory, which in this example is the second memory 150.

The controller 140 calculates a checksum on the new software transmitted by the update server processor 100 and compares the calculated checksum against a checksum transmitted to the cellular telephone 110 by the update server processor 100. If the calculated checksum does not match the transmitted checksum, the controller 140 requests a retransmission, does not toggle the designation of the two memories 130 and 150, and the cellular telephone 110 continues to operate using the original software, which for this example is located in the first memory 130. If, on the other hand, the checksum is successful the controller 140 toggles the designation of the two memories 130 and 150. Thus, for the example, memory 150 containing the new software is designated as active, and conversely, memory 130 is designated as inactive. The cellular telephone 110 now uses the new software located in the second memory 150 which becomes the current version of the software. Finally, the cellular telephone 110 transmits a message to the update server processor 110 acknowledging the successful update.

Figure 2:
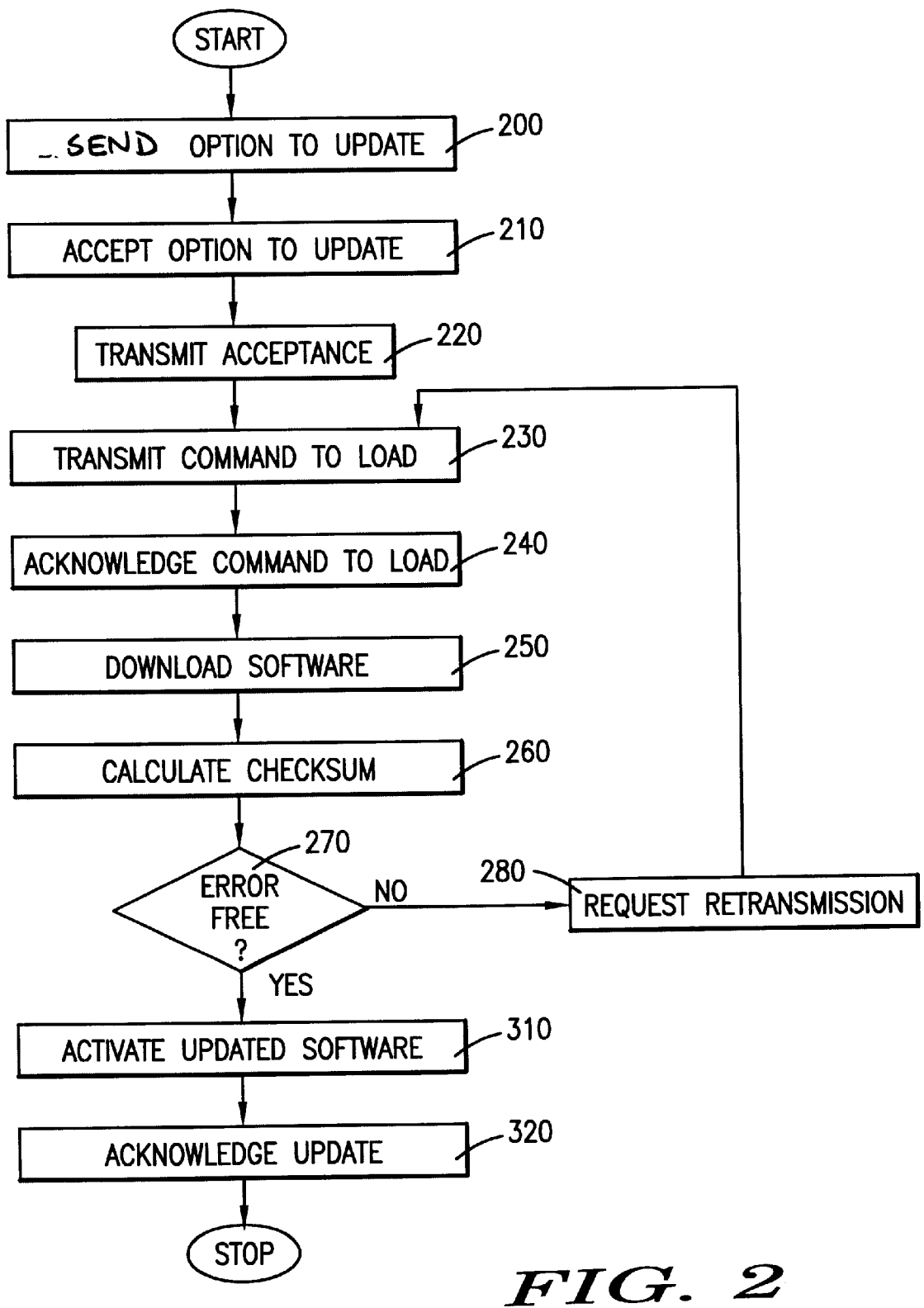
FIG. 2 illustrates a flow diagram for a preferred embodiment of the present invention.

Referring additionally now to FIG. 2, there is illustrated a flow diagram for a preferred embodiment of the present invention. The update server processor 100 sends an offer to remotely update the cellular telephone software (step 200). The update server processor 100 uses a Short Message Services (SMS) of the cellular telephone network 120 to transmit a SMS message to either a single cellular telephone or to a plurality of cellular telephones. The offer to update the cellular telephone software appears on an alphanumeric display of the cellular telephones intended to receive the offer. The process of sending the SMS messages is well known in the industry. Alternatively, the update server processor 100 can place a cellular telephone call to the intended cellular telephone 110 and announce the offer to update the cellular telephone software.

After receiving the offer to update the software the cellular telephone subscriber can choose to ignore the offer by doing nothing resulting in the cellular telephone 110 continuing to operate using the software currently residing in the active memory, which for this example is the first memory 130. Alternatively, the cellular telephone subscriber can choose to accept the offer (step 210) to update the software by following the instructions contained in the offer to update. To accept the offer, the cellular telephone subscriber is typically instructed to press a single or a series of keys located on the cellular telephone 110.

In response to the cellular telephone subscriber's acceptance of the update, the cellular telephone 110 transmits a SMS message to the update server processor 100, wherein the message contains an acceptance code and the telephone number of the cellular telephone 110 (step 220). The update server processor 100 receives the acceptance code and transmits a SMS message containing a command instructing the cellular telephone 110 to wait for a program download (step 230) and the cellular telephone 110 responds by transmitting a SMS message containing an acknowledgment of the command (step 240). In response to receiving the acknowledgment from the cellular telephone 110, the update server processor 100 begins downloading software (step 250). To download the software, in a first embodiment, the update server processor 100 places a cellular telephone call to the cellular telephone 110 via the cellular telephone network 120, and in another embodiment, the phone could call the processor to have the software downloaded, thereby opening up a digital traffic channel between the update server processor 100 and the cellular telephone 110. If the subscriber does not select immediate download, he/she will be given a telephone number which he/she can call at a later date and receive the upgraded software.

In a first embodiment of the present invention, the update server processor 100 downloads the software by placing a call to the cellular phone and performing an Interim Standard-136 data transfer to the cellular telephone 110 on the digital traffic channel. The update server processor 100 transmits a header containing the length of the file to be downloaded and a checksum performed on the file by the update server processor 100 and further transmits the software to the cellular telephone 110.

In a second embodiment of the present invention, the update server processor 100 rather than performing an Interim Standard-136 data transfer, instead places a call to a cellular phone and transmits the software via SMS messages on the digital traffic channel. The process of transmitting SMS messages on the digital traffic channel is well known in the industry. As in the first embodiment, the update server processor 100 transmits a header containing the length of the file to be downloaded, a checksum for the data being transmitted as well as the actual software in the SMS message.

As the cellular telephone 110 receives the software using either of the two embodiments of the present invention, the controller 140 places the software in the inactive memory, which in the case of this example is the second memory location 150. After the software has been downloaded into the memory of the cellular telephone 110 the controller 140 calculates a checksum on the downloaded software (step 260). The controller 140 compares the calculated checksum against the transmitted checksum to determine whether the software transfer was successful (step 270) If an error was detected, the cellular telephone 110 sends a SMS message to the update server processor 100 requesting a retransmission of the software (step 280) and the update server processor 100 retransmits the software beginning with the transmission of the command instructing the cellular telephone 110 to prepare for a software download (step 230). Otherwise, if no errors were detected, the controller 140 designates the memory containing the newly downloaded software, which for this example is the second memory 150 as the active memory, and conversely, designates the formerly active memory, in this case the first memory 130 as inactive (step 310). This redesignation or toggling of the two memories 130 and 150 results in the cellular telephone using the newly downloaded software in place of the older software. Finally, the cellular telephone 110 releases the call and transmits a SMS message on the DCCH containing an acknowledgment that the update was successful to the update server processor 100 (step 320).

Although the preferred embodiments of the methods and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for downloading software to a cellular telephone comprising the steps of:

transmitting, by a processor, a first short message services message to the cellular telephone, wherein the message contains a command for the cellular telephone to prepare to receive software;

transmitting, by the cellular telephone, a second short message services message, wherein the message contains an acknowledgment in response to the first message;

transmitting, by the processor, the software;

receiving, by the cellular telephone, the software; and loading the transmitted software into an inactive memory of the cellular telephone.

2. The method of claim 1, wherein the software is transmitted as a short message services message on a digital traffic channel.

3. The method of claim 1, wherein the software is transmitted as an IS-136 data transmission on a digital traffic channel.

4. The method of claim 1, wherein the step of transmitting the software further includes transmitting a header containing a length of the software and a checksum of the software.

5. The method of claim 4, further including the steps of:
calculating a checksum on the downloaded software;
comparing the calculated checksum against the checksum contained in the transmitted header; and
requesting a retransmission of the software if the calculated checksum does not match the transmitted checksum.

* * * * *